UNITED STATES PATENT OFFICE.

HENRY A. KOHMAN, OF PITTSBURGH, PENNSYLVANIA, CHARLES HOFFMAN, OF NEW ROCHELLE, NEW YORK, AND ALFRED EDWARD BLAKE, OF PITTSBURGH, PENNSYLVANIA, ASSIGNORS, BY MESNE ASSIGNMENTS, TO WARD BAKING COMPANY, OF NEW YORK, N. Y., A CORPORATION OF NEW YORK.

MANUFACTURE OF BREAD.

1,158,934.  Specification of Letters Patent.  Patented Nov. 2, 1915.

No Drawing. Original application filed March 26, 1913, Serial No. 756,940. Divided and this application filed December 10, 1914. Serial No. 876,501.

*To all whom it may concern:*

Be it known that we, HENRY A. KOHMAN, CHARLES HOFFMAN, and ALFRED EDWARD BLAKE, all citizens of the United States, residing, respectively, at Pittsburgh, Allegheny county, State of Pennsylvania, New Rochelle, Westchester county, State of New York, and Pittsburgh, Allegheny county, State of Pennsylvania, have invented certain new and useful Improvements in the Manufacture of Bread; and we do hereby declare the following to be a full, clear, and exact description of the invention, such as will enable others skilled in the art to which it appertains to make and use the same.

In an application for Letters Patent of the United States, filed by us, under date of March 26, 1913, Serial No. 756,940, we have described certain improvements in the making of leavened bread, based upon the discovery that whether the bread is made in accordance with the sponge process or in accordance with the straight dough process, the quantity of yeast that would otherwise be necessary for completing the fermentation within a given period of time may be very materially diminished by supplying to the batch certain salts which have a stimulating effect upon the activity and propagation of the yeast cells, in the presence of the starchy dough mixture; and that, also, employing the same quantity of yeast as that ordinarily used, the employment of the salts permits the fermentation of the batch of dough to proceed more rapidly, while still preserving satisfactory commercial conditions so that, when desired, the bread-making process may be finished in a correspondingly lesser period of time.

The present application constitutes a division of the application hereinbefore referred to and relates particularly to the incorporation of a suitable calcium salt or salts with the yeast, flour, and other ingredients of the dough batch, and then fermenting the batch.

The invention lends itself particularly to economy of manufacture, for the reason that it can be practised by the aid of calcium salts of low cost, as, for instance, by the use of calcium sulfate. So also, relatively small amounts of the calcium salts are required for the production of the desired effects, and the employment of the calcium salts in the bread-making operation is of advantage in that it makes up in part at least, the deficiency in calcium salts which is characteristic of white bread, wherein the amount of mineral matter present is extremely low.

The invention may be practised, by adding to the batch, either at the commencement of the batch process or at the commencement of the straight dough process, two ounces of calcium sulfate to each 100 pounds of flour contained in the mixture. The operation is thus enabled to complete the required fermentation of the batch within a given interval of time with the employment of a much lesser quantity of yeast than that usually required; or, with the employment of a given quantity of yeast, to materially cut down the time required for the fermentation. It is not found of advantage to increase these proportions, but they may be considerably diminished and yet give important and valuable results. It will be understood, therefore, that while recommending as preferable the employment of two ounces of calcium sulfate to each 100 pounds of flour contained in the mixture, the invention is not restricted to that proportion.

Calcium sulfate is a neutral salt. It is cheap and non-hygroscopic and, with a suitable filler, such as, for instance, flour, or some other suitable starchy material, it is well adapted to be made up into a suitable mixture that can be used with convenience and accuracy as a composition of matter for sale to the trade.

The invention is not restricted to the employment of calcium sulfate, nor to the employment of neutral calcium salts. Thus, in some instances, it may be feasible and desirable to use the acid salts, or even those salts which give an alkaline reaction. For instance, calcium diacid phosphate, Ca $(H_2PO_4)_2$, is available for the purpose, in lieu of calcium sulfate, although of higher cost.

Where the calcium salt is put upon the market in the form of a composition of matter in connection with a filler of flour or other starchy material, the filler should be of such relatively larger amount (say ten times the amount by weight of the salt) that any slight inaccuracies of the user, in adding the mixture to the batch, will be correspondingly unimpotant for the realization of the intended results. It is further apparent that, if desired, the necessary proportion of the calcium salt may be incorporated in the flour at the time it is barreled at the mill and may be sold to the trade in that form.

It is a characteristic of the invention that the fermentation proceeds more slowly in the initial part of the fermentative process than is the case with the ordinary dough-raising operation. As the fermentation proceeds, however, its rate increases, so that, as hereinbefore indicated, the batch is "ready" at the same time that the batch would be ready in the ordinary process. In view of the fact that the rate of progress of the fermentative action is less in the initial stage of the operation, which fact is manifested by the lesser production of carbonic acid, there is a surprisingly lessened consumption of sugar in the use of the process, the saving in this regard amounting, under favorable circumstances, to as much as one pound in the treatment of a batch of one barrel of flour. It is also found that bread made in accordance with the invention is appreciably lighter in color than when made in the ordinary process when conducted under otherwise similar conditions.

What we claim is:

1. The process of making leavened bread, which comprises incorporating with the flour and other ingredients of the dough batch an amount of yeast normally insufficient to effect the desired leavening within a given time period, further incorporating in the dough batch a quantity of an innocuous calcium salt and thereby economizing in the amount of yeast normally employed for said period, and fermenting the batch; substantially as described.

2. The process of making leavened bread, which comprises incorporating with the flour and other ingredients of the dough batch an amount of yeast normally insufficient to effect the desired leavening within a given time period, further incorporating in the dough batch a quantity of calcium sulfate and thereby economizing in the amount of yeast normally employed for said period, and fermenting the batch; substantially as described.

In testimony whereof we affix our signatures in the presence of two witnesses.

HENRY A. KOHMAN.
CHARLES HOFFMAN.
ALFRED EDWARD BLAKE.

Witnesses to the signatures of Henry A. Kohman and Alfred Edward Blake:
S. C. PERRING,
JOS. F. SMITH.

Witnesses to the signature of Charles Hoffman:
M. A. BELL,
L. BATES.